July 16, 1940.  A. C. WINCHESTER  2,208,403
CAMERA FOCUSING APPARATUS
Filed Nov. 19, 1938  2 Sheets-Sheet 1

Inventor
ARMSTEAD C. WINCHESTER
By
Attorney

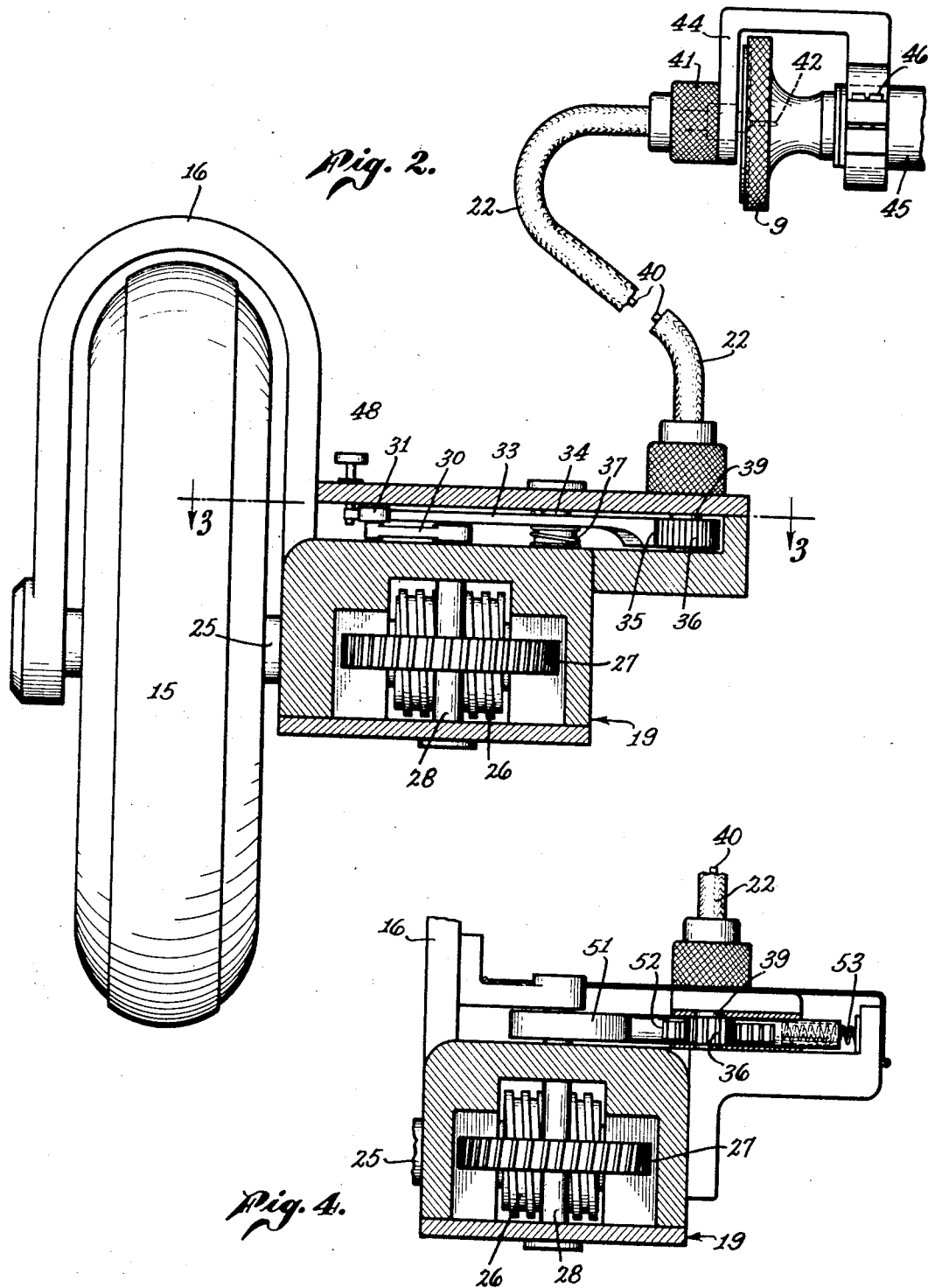

Patented July 16, 1940

2,208,403

UNITED STATES PATENT OFFICE 2,208,403

CAMERA FOCUSING APPARATUS

Armstead Cory Winchester, Los Angeles, Calif., assignor to Radio Keith Orpheum Corporation, a corporation of Maryland Application November 19, 1938, Serial No. 241,341

4 Claims. (Cl. 88—16)

This invention relates to motion picture apparatus and particularly to an attachment for a motion picture camera and its associated dolly whereby the focus of the camera is automatically adjusted according to the position of the camera from the subject being photographed.

In motion picture practice it is common to make what are called "dolly shots" wherein the dolly, which is mounted on wheels, carries a camera toward and away from the subject or scene being photographed during the photographing process. A certain path of travel from a long-shot position to a close-up position may be laid out on the floor of the set in front of the action. The scene is then photographed during the time the dolly and camera are moved from the long-shot position to the close-up position, or vice versa. As practically all motion picture cameras have fast, high-quality, variable-focus lenses with corresponding shallow depths of focus, it becomes necessary to continually change the focus of the lens during movement of the camera toward or away from the scene.

An object of the present invention, therefore, is to automatically adjust the focus of a camera lens with changes in distance between the camera and the scene of action.

Another object of the invention is to provide a motion picture camera with an automatic focusing attachment for dolly shots, which attachment is readily attachable and detachable from motion picture cameras and their associate dollies.

A further object of the invention is to provide an automatic focusing attachment for motion picture cameras with interchangeable lenses and which is simple, accurate and easily adjustable to any predetermined path of travel of the dolly.

Although the novel features which are believed to be characteristic of this invention will be pointed out with particularity in the claims appending herewith, the invention itself, its objects and advantages, the manner of its organization and the mode of its operation will be better understood by referring to the following description read in conjunction with the accompanying drawings forming a part thereof, in which:

Figure 2 is a partial cross-sectional view of the automatic focusing attachment of the invention;

Figure 4 is a cross-sectional view of a modification of the cam and gear arrangement shown in Figure 2.

Figure 1:
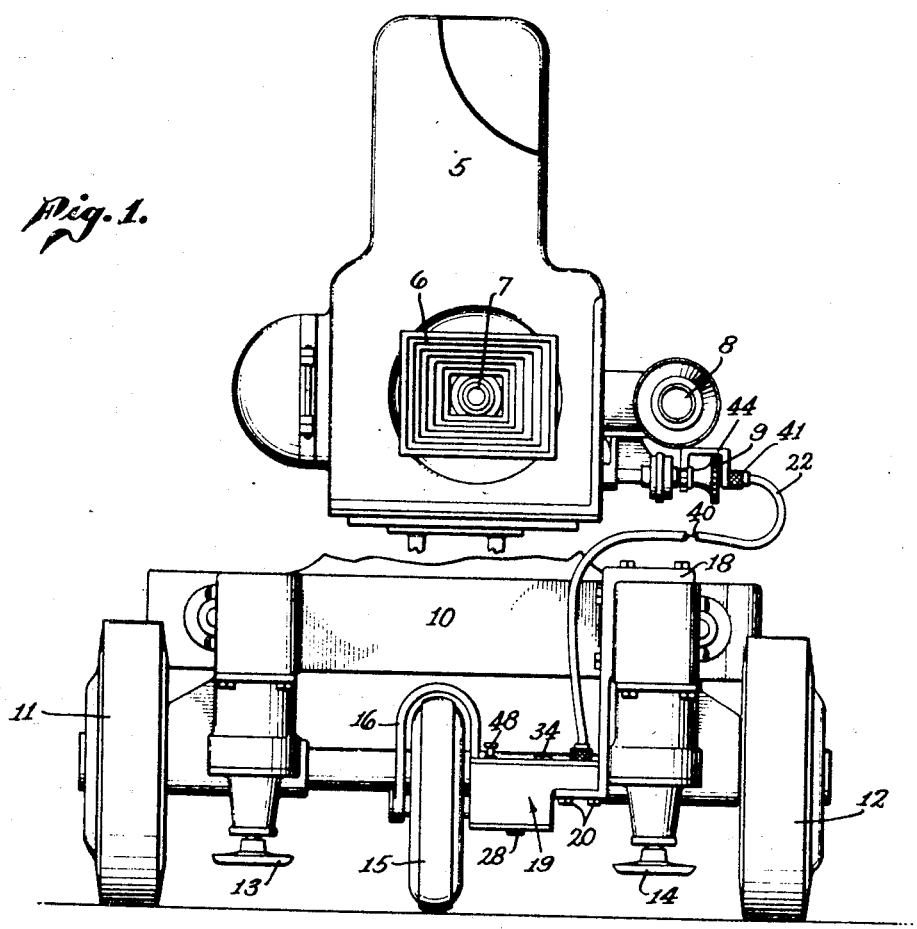
Figure 1 is a partial front elevational view of a dolly and motion picture camera with the invention attached thereto.
Figure 3:
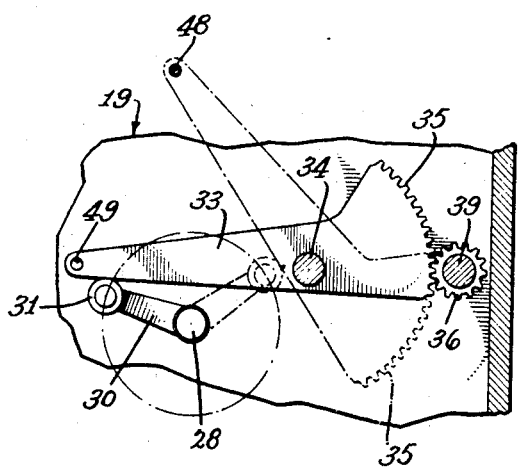
Figure 3 is a detail of the cam and gear arrangement taken along the line 3—3 of Figure 2.

Referring now to the drawings, particularly Figs. 1, 2 and 3, a motion picture camera within a blimp 5 has a light shade 6, lens 7, a finder 8 and a manual focusing knob 9. The upper portion of a dolly 10 is not shown for the sake of clarity, the portion shown comprising a pair of front wheels 11 and 12 and stabilizing jacks 13 and 14. A dolly of this type is disclosed and claimed in co-pending application Ser. No. 154,587, filed July 20, 1937.

The invention of this application is directed to the attachment which includes a wheel 15 mounted in a yoke 16 attached to an L-shaped housing 19. The housing 19 is attachable and detachable by means of bolts 20 to a Z-bracket 18 mounted on the dolly. Extending from the housing 19 to the focusing knob 9 is a flexible shaft or cable 40 within a conduit 22.

Referring now to the detailed drawings of the attachment, as shown in Fig. 2, it is to be noted that the wheel 15 is fixedly mounted on a shaft 25 upon which is mounted a worm wheel 26 within the housing 19. The worm 26 is in mesh with a gear 27 mounted on a shaft 28. Fixedly attached to one end of the shaft 28 is an arm or cam lever 30 having a roller 31 rotatably mounted at the other end thereof. The roller 31 is adapted to contact a lever 33 pivoted on a shaft 34 and biased toward the lever 33 by a spring 37, the other end of the lever 33 having gear teeth 35 adapted to mesh with a gear 36 so that any movement of the arm 33 will rotate the gear 36 (see Fig. 3).

The gear 36 is fixedly attached to a shaft 39 which is connected to the flexible shaft 40 within the conduit 22. The shaft 40 is connected at its other end by means of a terminal 41 and a pin 42 to the focusing knob 9 so that any turning movement of the shaft 40 will turn the knob 9. Although a flexible cable is shown as a preferred form, it is to be understood that other means of transmission between the gear 36 and knob 9 may be employed, such as a series of shafts, pulleys, belts or gear trains. To facilitate the attachment of the terminal 41 with the knob 9, a yoke member 44 is employed which has one end mounted on a housing 45 by a screw 46. A hand-operable pin 48 is adapted to be automatically inserted in a hole 49 at the end of the arm 33 to maintain it in infinity position when that position is reached. To accomplish this, the end of the pin is beveled or tapered. It is thus necessary to lift the pin upwardly to release the arm 33. This is desirable so that in moving the camera away from the scene after the infinity position is reached, the arm 30 may continue to rotate while maintaining the focus of the camera at the infinity position.

Although the operation of this automatic focusing device may be apparent from the above description, it may be simply described as follows: After the predetermined path of the dolly travel has been determined, at least one of the extreme positions is measured for the purpose of determining the focus at that point. When this has been determined, the wheel 15 may be lifted slightly and rotated so that the proper focus is obtained, the focus indicator on the camera being used for this purpose. Should the adjustment be made at the distant position from the scene, then moving the camera forward will move the lens outwardly to maintain the proper focus of the screen on the film as the camera approaches the object being photographed. Should the adjustment be made at the close-up position, then the camera may be moved away from the object and the lens moved toward the film to maintain the proper focus. In the latter case, should the path of travel extend beyond the infinity position of the lens, the pin 48 will drop in hole 49 when the arm 33 reaches its extreme or infinity position and maintains the lens focused for infinity during further travel of the camera.

The attachment may be employed with lenses of different focal lengths, since it has been designed to operate with the invention disclosed and claimed in United States Patent 2,140,260, of December 13, 1938, wherein the attachment of each lens to the camera automatically adjusts the focusing control, such as knob 9 and its associate focus indicator, to correspond to the particular focal characteristic of each lens. The ratios of the various gears and the cam actions have been designed so that a 100-to-1 ratio exists between the worm 26 and its associate gear 27. With this ratio the cable 40 and focusing knob 9 are rotated ¾ of a revolution from a close-up to an infinity position for cam movement of ⅓ of a revolution.

Another modification of the cam and gear arrangement is shown in Fig. 4 wherein the casing 19 shows the same worm 26 and gear 27. The shaft 28 of the gear 27, however, has mounted on the end thereof an elliptical cam 51 which operates against a rack 52 and is maintained thereagainst by expansion spring 53. The rack 52 is in mesh with the flexible shaft gear 39, as is the case in the embodiment shown in Fig. 2. This arrangement is somewhat simpler than the arm-and-lever arrangement of Fig. 2 and may be desirable in some instances.

I claim:

1. An attachment for a motion picture camera having a manual focusing adjustment means comprising a wheel adapted to be rotated during movement of said camera toward and away from an object being photographed, a worm rotatable by said wheel, a gear meshing with said worm, an arm rotatable about one end thereof by said gear, a pivoted lever adapted to be contacted by said arm for rotation of said lever, means interconnecting said lever and said focusing adjustment means, and means for maintaining said pivoted lever in a definite predetermined position during movement of said camera beyond infinity focusing position of the lens of said camera and further rotation of said arm.

2. An attachment for a motion picture camera comprising an adjustable lens for said camera, means for focusing said lens, means rotatable with movement of said camera toward and away from an object being photographed, and means interconnecting said rotatable means and said lens, said last-mentioned means including a rotatable cam geared to said rotatable means, one position of said cam corresponding to the infinite focusing position of said lens, a lever operated by said cam, flexible means for transmitting motion from said lever to said lens focusing means, and means for maintaining said lever in said position corresponding to infinite focusing position of said lens during further movement of said camera away from said object and further movement of said cam.

3. An automatic focusing attachment for a camera lens adapted to be moved away from an object during the photographing process comprising a rotatable cam, worm and gear means for rotating said cam upon movement of said camera, means for focusing said lens, a lever contacting said cam and moved by said cam upon rotation thereof for focusing the lens of said camera, means for connecting said lever to said lens focusing means, said lever normally following said cam beyond the infinity focusing position of said camera lens, and means for maintaining said lever in a position corresponding to infinity focusing position of said lens during further movement of said camera away from said object.

4. An automatic focusing attachment for a camera lens adapted to be moved toward and away from an object during the photographing process comprising means for focusing said lens, a lever connected to said lens focusing means for adjusting the lens of said camera upon a certain amount of rotation of said lever, a cam contacting said lever and rotatable with movement of said camera for moving said lever, said cam reaching its limiting position before said camera reaches its limiting photographing position, and a pin adapted to lock said lever at a position corresponding to the limiting position of said cam during further movement of said camera and cam.

ARMSTEAD CORY WINCHESTER.